United States Patent [19]
Bré et al.

[11] Patent Number: 4,584,215
[45] Date of Patent: Apr. 22, 1986

[54] POLYVINYLIDENE FLUORIDE COMPOSITIONS OF IMPROVED FLEXIBILITY AND THEIR USE, PARTICULARLY IN THE MANUFACTURE OF FLEXIBLE TUBES

[75] Inventors: Anne Bré, Le Plessis Belleville; Marc Mollard, Montesson; Maseh Osgan, Paris, all of France

[73] Assignee: Institut Francais du Petrole, Rueil-Malmaison, France

[21] Appl. No.: 708,835

[22] Filed: Mar. 6, 1985

[30] Foreign Application Priority Data

Mar. 6, 1984 [FR] France ............................... 84 03574

[51] Int. Cl.$^4$ .................. C08K 5/10; C08L 27/16; B26D 23/04
[52] U.S. Cl. ................................. 428/36; 524/290; 524/291; 524/292; 524/308; 524/310; 524/312; 524/314; 524/545
[58] Field of Search ............... 524/292, 291, 312, 314, 524/545, 290, 308, 310; 428/35

[56] References Cited

U.S. PATENT DOCUMENTS

| | | | |
|---|---|---|---|
| 2,849,412 | 8/1958 | Robb et al. | 524/545 |
| 2,884,399 | 4/1959 | Barnhart et al. | 524/285 |
| 3,541,039 | 11/1970 | Whiton | 524/311 |
| 3,642,684 | 2/1972 | Kusuno et al. | 524/545 |
| 4,416,925 | 11/1983 | Goll et al. | 524/296 |

Primary Examiner—Herbert J. Lilling
Attorney, Agent, or Firm—Millen & White

[57] ABSTRACT

Polyvinylidene fluoride compositions have their flexibility improved by incorporation therewith of a minor proportion of one or more esters formed between at least one aliphatic diol such as 2,2-dimethyl 1,3-propanediol, a polyethylene glycol, propylene glycol, a polypropylene glycol, tetramethyleneglycol, a polytetramethyleneglycol or an aliphatic triol such as glycerol, and a monocarboxylic acid of aliphatic chain containing 2 to 10 carbon atoms or a monocarboxylic acid of aromatic radical such as benzoic acid. Polyvinylidene fluorides of improved flexibility are particularly useful for manufacturing flexible tubes for conveying various fluids such as, for example, hot water, chemical products, hydrocarbons.

22 Claims, No Drawings

POLYVINYLIDENE FLUORIDE COMPOSITIONS OF IMPROVED FLEXIBILITY AND THEIR USE, PARTICULARLY IN THE MANUFACTURE OF FLEXIBLE TUBES

This invention concerns compositions of polyvinylidene fluoride of improved flexibility, the manufacture of said compositions and their uses.

BACKGROUND OF THE INVENTION

Polyvinylidene fluoride is known as having a certain number of advantageous properties, particularly a relatively low melting temperature (about 170° to 180° C. depending on its crystallinity degree) which facilitates its shaping (for example by extrusion) and the assembling of parts by welding; it further has a very good chemical resistance to many agents, as well as an excellent behaviour to heat. However, its major defect, due to its crystalline nature, is its high rigidity, which is a bar to its use in a flexible structure.

In the prior art, attempts have been made to cope with this disadvantage by various methods of internal plasticizing (i.e. by copolymerzing vinylidene fluoride with other monomers imparting more flexibility) or external plasticizing (i.e. by incorporating to the polymer various compounds acting as plasticizers).

Whereas the internal plasticizing of polyvinylidene fluoride has been widely studied, it must be observed that it produces a deep disorder in the structure of the homopolymer, which may have an important effect on its properties (for example a decrease of the melting point and of the thermal stability).

As concerns the external plasticizing of polyvinylidene fluoride and also polyvinylidine chloride, the difficulty encountered originates in its highly crystalline nature making imcompatible most of the plasticizers known for polymeric substances produced from vinyl monomers.

Nevertheless, various documents of the prior art relate to external plasticizing of polyvinylidene fluoride or of copolymers containing vinylidene fluoride with other halogeno-olefinic monomers.

For example, U.S. Pat. No. 2,820,772 discloses mainly the plasticizing of trifluorochloroethylene polymers and also that of polymers of vinylidene fluoride with trifluorochloroethylene telomers.

According to U.S. Pat. No. 2,884,399, non-crystalline copolymers of trifluorochloroethylene with vinylidene fluoride (said copolymers containing at least 20% by moles of trifluorochloroethylene), in particular, are plasticized by means of a tetraester formed between a dihydroxylated compound, a dicarboxylic acid and a monohydroxylated compound.

In other respects, U.S. Pat. No. 3,541,039 discloses the plasticizing of polyvinylidene fluoride by polyesters formed between a linear aliphatic dicarboxylic acid of 4 to 8 carbon atoms and an aliphatic diol of 4 to 7 carbon atoms. Specific products are poly(2,2-dimethylpropylene sebacate) and poly(1-methyl propylene adipate).

French patent application No. 2,243,970 discloses the use of acetyl polyesters (for example an acetate of adipic acid-propylene glycol polyester) for plasticizing a polyvinylidene fluoride. Adipic acid-propyleneglycol polyesters are also used to plasticize polyvinylidene fluoride according to Japanese patent application No. 80/84 413. Similarly in Japanese patent application No. 81/20 610, an acetyl polyester is used, for example an acetate of poly(adipic acidpropyleneglycol) to plasticize a mixture of polyvinylidene fluoride with a polymer of methyl acrylate (methyl polyacrylate or isobutylene-methyl acrylate copolymer).

Finally, mention is also found in the prior art of the improvement obtained by using fluorinated resins polyvinylidene fluoride, polychlorotrifluoroethylene) with plasticizers of fluoroalkylphosphate structure (Japanese patent No. 77/73,956) as well as the use of cyanoethyl ethers for decreasing the value of the elasticity modulus polyvinylidene fluoride (Japanese patent application No. 82/187,344).

SUMMARY OF THE INVENTION

It has now been discovered that it is possible to use as plasticizers for polyvinylidene fluoride certain non polymeric compounds providing, as compared to the compounds recommended in the prior art, for a certain number of unexpected improvements. They are very easily incorporated into polyvinylidene fluoride, they withstand heat satisfactorily and impart to the polymer an increased flexibility (decrease of the elasticity modulus, increase of the elongation at the yield limit and of the elongation at break). They further have a good compatibility with polyvinylidene fluoride, resulting particularly in a reduced migration.

Polyvinylidene fluorides considered in this invention are polymers of high crystallinity containing at most 5% by moles of a different monomer, of the halogenoethylene type (e.g. trifluorochloroethylene, tetrafluoroethylene, dichlorodifluoroethylene or trifluoroethylene).

They generally have an average molecular weight of at least 100,000 by weight, which can be as high as, for example, 1,500,000. They may also be prepared by free radical polymerization according to conventional methods.

Generally, the polyvinylidene fluoride compositions may be defined as comprising a major proportion of a polyvinylidene fluoride polymer and a minor proportion, sufficient to improve the flexibility, of at least one compound of ester type formed between at least one monocarboxylic acid having an aliphatic or aromatic hydrocarbon radical and at least one polyol selected from aliphatic diols and triols. Particular consideration is given to esters formed between aliphatic diols selected from 2,2-dimethyl-1,3-propanediol (neopentylglycol), polyethyleneglycols containing at least 2 and for example up to 20 ethylene oxide recurrent units (particularly diethyleneglycol and triethyleneglycol) propyleneglycol, polypropyleneglycols containing at least 2 and, for example, up to about 15 propylene oxide recurrent units (particularly dipropyleneglycol), tetramethyleneglycol and polytetramethyleneglycols containing at least 2 and for example up to 12 tetramethylene oxide recurrent units, or aliphatic triols such as glycerol; and monocarboxylic acids selected from those having an aliphatic chain containing 2 to 10 carbon atoms and those having an aromatic radical such as benzoic acid. Particular consideration is given to esters having a molecular weight from about 300 to about 1,000.

A random copolymer or a block copolymer of two different alkyleneglycols, in various proportions, as for example a poly(ethylene-propylene)glycol, can be used as diol of the polyalkyleneglycol type, according to the invention, to form the ester.

Particularly advantageous plasticizing esters used according to the invention are:
2,2-dimethyl 1,3-propanediol dibenzoate,
diethyleneglycol dibenzoate,
triethyleneglycol diheptanoate,
propyleneglycol dibenzoate,
dipropyleneglycol dibenzoate and
glycerol tribenzoate.

These esters, used as plasticizers in compositions of polyvinylidene fluoride according to the invention, are incorporated therewith in proportions of, for example, 1-25% by weight and, preferably, 5-15% by weight.

As a general rule, the incorporation of plasticizers with the polyvinylidene fluoride may be achieved by various known methods using different mixing apparatuses currently used in the industry of rubber and plastic transformation, e.g. extruders equipped with one screw, two screws or specific mechanical devices, as well as cylinder-or blade-mixers, etc.

The temperature is generally from 180° to 300° C. (e.g. 180°-240° C.). As a matter of fact, the homogeneous incorporation of the plasticizer with the polyvinylidene fluoride requires the complete melting of the polymer, by heating it at a temperature higher than 170° C. Moreover, during the mixing or the different processing methods, the temperature of the mixture must never exceed 350° C., so as to avoid any thermal decomposition of the polymer.

The compositions of polyvinylidene fluoride of increased flexibility, according to the invention, can be used in various applications requiring materials having both a high heat stability and a good flexibility. They are particularly convenient for manufacturing injection-molded parts or extruded objects such as films, sheets, sheaths or tubes, particularly tubes for conveying various fluids such for example as hot water, chemical products or hydrocarbons.

EXAMPLES

The following examples illustrate the invention, but must not be considered in any way as limiting the scope thereof. Compositions H to Q have been prepared for comparison purpose.

In examples 1 to 4, the polyvinylidene fluoride is of the type available in the trade, having an average molecular weight of about 170,000 by weight. Its mechanical properties (measured under conditions identical to those of the hereinafter described compositions and on the same type of test pieces obtained from molded plates, according to the process defined below) are as follows:

| Elastic modulus | 1.700 | MPa |
| --- | --- | --- |
| Stress at yield limit | 54.5 | MPa |
| Elongation at yield limit | 8.3 | % |
| Breaking stress | 40 | MPa |
| Elongation at break | ~30 | % |

EXAMPLE 1

The purpose was to incorporate to a polyvinylidene fluoride a proportion of 10% by weight of each of the following esters:
Composition A: 2,2-dimethyl 1,3-propanediol dibenzoate
Composition B: diethyleneglycol dibenzoate
Composition C: triethyleneglycol diheptanoate
Composition D: propyleneglycol dibenzoate
Composition E: dipropyleneglycol dibenzoate
Composition F: a 50/50 mixture by weight of diethyleneglycol dibenzoate and dipropyleneglycol dibenzoate.
Composition G: glycerol tribenzoate.

The plasticizer is incorporated with the homopolymer by mixing on cylinders, at 200° C. The polyvinylidene fluoride granules are preliminarily molten on the cylinders, and then the suitable amount of selected plasticizer is incorporated as quickly as possible in order to avoid losses by volatility.

On the other hand and by way of comparison, the incorporation with polyvinylidene fluoride of the same proportion of 10% by weight of other compounds, some of which are already known as plasticizers, have been tried:
Composition H: pentaerythritol tetrabenzoate
Composition I: N-ethyl (o,p)-toluene sulfonamide
Composition J: 2-ethyl hexyl and diphenyl phosphate
Composition K: 2-ethyl hexyl trimellitate
Composition L: methyl abietate
Composition M: di(n-hexyl) azelate
Composition N: butyl and benzyl phthalate
Composition O: a so-called "linear" phthalate sold by Monsanto under trade name Santicizer 711.
Composition P: di(2-ethyl hexyl) sebacate
Composition Q: dibutyl sebacate.

For each of the esters or mixture of esters used in compositions A to G, the incorporation was easy. It was also easy for compositions I, J, L, M, N, Q, whereas for compositions H K, O, P, the incorporation was either difficult (H, P) or even impossible (K, O), due to the fact that the mixture "does not set": the plasticizer, too fat, makes the mixture slippery on the cylinders and procuces the formation of balls or blocks which are not or are insufficiently homogenized with the remainder of the mixture.

In addition, for composition Q, a substantial loss of weight of the plasticizer (dibutyl sebacate) is observed during the incorporation.

When the plasticizer was successfully incorporated with the polyvinylidene fluoride, in the preceding example, the mixtures, obtained as strips, have been molded between two compression plates to form sheets of 1 and 2 mm thickness, wherefrom were cut out the test pieces used in the following examples 2 to 4.

The molding conditions are as follows:
190° C., under 200 bars for 5 minutes
slow cooling for 10 minutes by water circulation through the plates.

EXAMPLE 2

The materials (compositions K and O excluded) prepared as above described, as rectangles of 2 mm thickness, have been subjected to a heat test. The behavior of the materials under severe conditions (275° C. for 90 mn) has been observed. The results, reported in table 1, indicate the possibility or impossibility to proceed without decomposition risks, to extrusion or other processing methods.

Materials A to G according to the invention have a good qualitative behaviour, as well as the comparison materials L, M, N, Q. They undergo no (or very little) deformations, no clogging or darkening, in contrast to materials H, I, J, P. In particular, phosphate (J) and sulfonamide (I) give particularly unsatisfactory results in this respect (substantial darkening for both products, accompanied with a blistering and severe deformations for the phosphate). The other compositions (H, P) are not subjected to color changes, but suffer from important deformations.

TABLE I

| Material | Color | Aspect |
|---|---|---|
| A | White | Good |
| B | Yellowish | " |
| C | " | " |
| D | " | " |
| E | " | " |
| F | " | " |
| G | Greyish | very slight deform. |
| H | opaque white | deformations |
| I | black | good |
| J | black | blistering, deformations |
| L | Clear brown | slight deformation |
| M | yellowish | " |
| N | " | good |
| P | " | deformations |
| Q | " | very slight deformation |

EXAMPLE 3

The mechanical tensile characteristics of the above-described materials A to G, H, L, M, N, P and Q were measured by the standardized method ISO R 527.

Test pieces are of the $H_2$ type (2 mm thickness). The temperature of the test is 20° C. and the traction velocity 5 mm/mn. The results of these determinations are reported in table 2, where are further recalled the values obtained by the same measuring methods on polyvinylidene fluoride (PVDF) alone.

TABLE 2

| Material | Elastic modulus (MPa) | stress at yield limit (MPa) | Elongation at yield limit (%) | Breaking stress (MPa) | Elongation at break (%) |
|---|---|---|---|---|---|
| PVDF alone | 1700 | 54.5 | 8.3 | 40 | ~30 |
| A | 863 | 37 | 18.5 | 38.5 | 357 |
| B | 1200 | 36 | 23 | 49 | 440 |
| C | 915 | 31.5 | 29 | 35 | 370 |
| D | 1200 | 39.5 | 19.5 | 36 | ~280 |
| E | 1150 | 38 | 16.5 | 40.5 | 385 |
| F | 1116 | 38.5 | 16.5 | 38.5 | 327 |
| G | 997 | 38 | 16 | 40 | 377 |
| H* | 1444 | 41 | 11.5 | 34 | 320 |
| L | 1700 | 42 | 9.5 | 36 | ~250 |
| M | 1400 | 28.5 | 5.5 | 30.5 | ~230 |
| N | ~1500 | 44.5 | 15.1 | 31 | 330 |
| P* | 1500 | 31.5 | 5.5 | 32.5 | ~50 |
| Q | 1545 | 38 | 15.5 | 30.5 | 260 |

*Difficult incorporation

From these results, it appears that the mechanical properties of the esters of monocarboxylic acids and of diols or triols (compositions A to G) are very substantially improved. On the contrary, the ester or tetrol (pentaerythritol tetrabenzoate) gives only relatively poor results (composition H).

Compositions L and M have not satisfactory values of elastic modulus and elongation at yield limit. As concerns sebacates (compositions P and Q), the di(2-ethyl hexyl) sebacate is difficult to incorporate and gives very poor results, particularly with respect to the elongation at yield limit and at break, and the dibutyl sebacate leads to an elastic modulus which is still too high. Butyl and benzyl phthalate (composition N) does not provide for a sufficient decrease of the elastic modulus and of the stress at yield limit.

EXAMPLE 4

Some of the preceding materials (cut out as discs of 1 mm thickness) have been subjected to a compatibility test, wherein is estimated the resistance to the migration of the plasticizer by adsorption of the latter by finely divided silica. Measurements have been performed after seven days of test and the relative loss of plasticizer, in % by weight (in proportion of the total weight of the "polyvinylidene fluoride+plasticizer" test piece) has been determined. The results are reported in Table 3.

TABLE 3

| MATERIAL | Migration in Silica % b.w. |
|---|---|
| A | 0.042 |
| B | 0.082 |
| C | 0.13 |
| D | 0.075 |
| E | 0.095 |
| F | 0.060 |
| G | 0.090 |
| H | 0.047 |
| N | 0.082 |
| Q | 0.25 |

These results show the good behaviour of materials A to G (particularly material A) and of materials H and N. On the contrary, composition Q is subjected to a very substantial migration.

The polyvinylidene fluoride used in examples 5 to 7 has a higher average molecular weight and a lower crystallinity than that used in examples 1 to 4.

The mechanical properties, mesured mostly in the same tensile conditions as precedingly, are as follows:

| Elastic modulus* | 1930 MPa |
|---|---|
| Stress at yield limit | 51 MPa |
| Elongation at yield limit | 9% |
| Breaking stress | 43.5 MPa |
| Elongation at break | 370% |

*(the elastic modulus has been measured in flexion).

EXAMPLE 5

Each of the following esters has been incorporated to the above-defined polyvinylidene fluoride, in a proportion of about 10% by weight.
Composition R: triethyleneglycol diheptanoate
Composition S: diethyleneglycol dibenzoate
Composition T: 2,2-dimethyl 1,3-propanediol dibenzoate;

For each of the esters involved in compositions R to T, the incorporation, performed as described in example 1, was conducted without difficulty.

EXAMPLE 6

The mechanical characteristics of each of materials R to T, prepared as indicated in example 5, have been determined. The measurements were conducted as described in example 3 and the results are given in Table 4 below. Except as otherwise indicated, the measurements have been performed under tensile conditions.

TABLE 4

| Material | Elastic modulus (MPa) | Stress at yield limit (MPa) | Elongation at yield limit (%) | Breaking stress (MPa) | Elongation at break (%) |
|---|---|---|---|---|---|
| PVDF alone | 1930* | 51 | 9 | 43.5 | 370 |

TABLE 4-continued

| Material | Elastic modulus (MPa) | Stress at yield limit (MPa) | Elongation at yield limit (%) | Breaking stress (MPa) | Elongation at break (%) |
| --- | --- | --- | --- | --- | --- |
| R | 1500 1065* | 37 | 20.5 | 44 | 415 |
| S | 1300 955* | 36.5 | 19.5 | ~56 | 455 |
| T | 1300 985* | 39.5 | 18.5 | 59 | 460 |

*Elastic modulus in flexion

From these results it appears that the mechanical properties of materials R, S and T are quite satisfactory.

EXAMPLE 7

Test pieces of materials R, S and T according to the invention (as discs of 1 mm thickness) have been subjected to the migration test in silica, as described in example 4.

For comparison purpose, a test piece, referred to as U, formed of the same polyvinylidene fluoride wherein 10% by weight of dibutyl sebacate was incorporated, has been subjected to the same test.

The results (measured after 7 days and 28 days) are reported in table 5 hereinafter.

TABLE 5

| Material | Migration in silica (% b.w.) | |
| --- | --- | --- |
| | after 7 days | after 28 days |
| R | 0.11 | 0.29 |
| S | 0.06 | 0.16 |
| T | 0.08 | 0.12 |
| U | 0.33 | 0.73 |

These results show a clearly improved behaviour of materials R, S, T, as compared with material U.

What is claimed as the invention is:

1. A composition of polyvinylidene fluoride, comprising a major portion of polyvinylidene fluoride of high crystallinity containing at most 5% by moles of a different halogenoethylene monomer, having an average molecular weight of at least 100,000, with which is incorporated a proportion, sufficient to improve flexibility, of at least one ester formed between, on the one hand, at least one aliphatic diol selected from 2,2-dimethyl-1,3-propanediol, polyethylene glycols containing 2 to about 20 ethylene oxide recurrent units per molecule, propylene glycol, polypropylene glycols containing from 2 to about 15 propylene oxide recurrent units per molecule, tetramethylene gylcol and polytetramethylene glycols containing from 2 to about 12 tetramethylene oxide recurrent units per molecule or an aliphatic triol and, on the other hand, at least one monocarboxylic acid having an aliphatic chain containing 2 to 10 carbon atoms or a monocarboxylic acid having an aromatic radical, said plasticizer being incorporated into the polyvinylidene fluoride while the latter is in the molten phase.

2. A composition according to claim 1, wherein said ester has a molecular weight from about 300 to 1,000.

3. A composition according to one of claims 1 and 2, wherein said ester is 2,2-dimethyl-1,3-propanediol dibenzoate, diethyleneglycol dibenzoate, triethyleneglycol diheptanoate, propyleneglycol dibenzoate, dipropyleneglycol dibenzoate or glycerol tribenzoate.

4. A composition according to claim 1, wherein said ester is incorporated with polyvinylidene fluoride in a proportion from 1 to 25% by weight.

5. A composition according to claim 4, wherein said proportion is from 5 to 15% by weight.

6. A composition according to claim 1, wherein said polyvinylidene fluoride has an average molecular weight from 100,000 to 1,500,000 by weight.

7. A composition according to claim 1, wherein said polyvinylidene fluoride comprises at most 5% of a copolymerizable ethylenic monomer.

8. A composition according to claim 1 wherein said at least one ester is neither dipropylene glycol dibenzoate nor polyethylene glycol dibenzoate.

9. A composition according to claim 8, wherein said ester is 2,2-dimethyl-1,3-propanediol dibenzoate, triethylene glycol diheptanoate, propylene glycol dibenzoate or glycerol dibenzoate.

10. A composition according to claim 9 wherein said at least one ester is 2,2-dimethyl-1,3-propanediol dibenzoate.

11. A composition according to claim 1 wherein said composition consists essentially of said major portion of polyvinylidene fluoride and said at least one ester.

12. A composition according to claim 8 wherein said composition consists essentially of said major portion of polyvinylidine fluoride and said at least one ester.

13. A composition according to claim 9 wherein said composition consists essentially of said major portion of polyvinylidine fluoride and said at least one ester.

14. A composition according to claim 1 wherein said polyvinylidine fluoride is a homopolymer.

15. A composition according to claim 8 wherein said polyvinylidine fluoride is a homopolymer.

16. A composition according to claim 9 wherein said polyvinylidine fluoride is a homopolymer.

17. An article of manufacture obtained by extruding a composition according to claim 11.

18. An article according to claim 17, in form of a tube.

19. An article of manufacture obtained by extruding a commposition of claim 12.

20. An article according to claim 19, in form of a tube.

21. An article of manufacture obtained by extruding a composition according to claim 1.

22. An article according to claim 21, in form of a tube.

* * * * *